(12) United States Patent
Hill

(10) Patent No.: US 10,520,097 B2
(45) Date of Patent: Dec. 31, 2019

(54) MULTI-FLOWPATH FLUID CONTROL VALVE

(71) Applicant: United Technologies Corporation, Farmington, CT (US)

(72) Inventor: James D. Hill, W. Abington Township, PA (US)

(73) Assignee: United Technologies Corporation, Farmington, CT (US)

( * ) Notice: Subject to any disclaimer, the term of this patent is extended or adjusted under 35 U.S.C. 154(b) by 219 days.

(21) Appl. No.: 15/405,692

(22) Filed: Jan. 13, 2017

(65) Prior Publication Data
US 2018/0202557 A1    Jul. 19, 2018

(51) Int. Cl.
| F16L 37/00 | (2006.01) |
| F16K 1/12 | (2006.01) |
| F16K 27/02 | (2006.01) |
| F01D 17/14 | (2006.01) |
| F16K 1/42 | (2006.01) |
| F01D 25/12 | (2006.01) |
| F01D 25/18 | (2006.01) |
| F02C 7/232 | (2006.01) |
| F02C 6/08 | (2006.01) |

(52) U.S. Cl.
CPC ............. *F16K 1/12* (2013.01); *F01D 17/145* (2013.01); *F16K 1/42* (2013.01); *F16K 27/02* (2013.01); *F16K 27/0254* (2013.01); *F01D 25/12* (2013.01); *F01D 25/18* (2013.01); *F02C 6/08* (2013.01); *F02C 7/232* (2013.01); *F05D 2220/32* (2013.01); *F05D 2250/311* (2013.01); *F05D 2250/36* (2013.01)

(58) Field of Classification Search
CPC .......... F16K 1/12; F16K 21/02; F01D 17/145; F02C 7/232

USPC ............ 137/599.01, 599.11, 599.13, 601.01, 137/601.12, 601.14, 601.15
See application file for complete search history.

(56) References Cited

U.S. PATENT DOCUMENTS

| 3,605,811 A | 9/1971 | Lovell | |
| 3,976,100 A * | 8/1976 | Souslin | B64D 39/06 137/614.03 |
| 4,471,938 A | 9/1984 | Schwarz | |
| 4,763,683 A * | 8/1988 | Carmack | F16L 37/32 137/594 |

(Continued)

FOREIGN PATENT DOCUMENTS

WO    9843006    10/1998

OTHER PUBLICATIONS

Extended EP Search Report for EP Appln. No. 18150892.0 dated Jun. 13, 2018.

*Primary Examiner* — Reinaldo Sanchez-Medina
(74) *Attorney, Agent, or Firm* — O'Shea Getz P.C.

(57) ABSTRACT

An assembly includes a valve housing and a valve element such as a poppet valve. The valve housing includes a tubular duct and an annular valve seat disposed within the tubular duct. A first flowpath includes an inner bore of the annular valve seat. A second flowpath includes an aperture formed between the annular valve seat and the tubular duct. The poppet valve is configured to engage the annular valve seat and substantially close the first flowpath when the poppet valve is in a first position. The poppet valve is further configured to disengage the annular valve seat and at least partially open the first flowpath when the poppet valve is in a second position.

19 Claims, 6 Drawing Sheets

(56) References Cited

U.S. PATENT DOCUMENTS

| | | |
|---|---|---|
| 4,805,658 A | 2/1989 | Perkinson et al. |
| 4,848,133 A | 7/1989 | Paulis et al. |
| 5,020,315 A | 6/1991 | Leachman, Jr. et al. |
| 5,072,781 A | 12/1991 | Goodman |
| 6,077,040 A | 6/2000 | Pruden et al. |
| 8,347,908 B2 | 1/2013 | Golecki et al. |
| 8,733,110 B2 | 5/2014 | Weber et al. |
| 8,984,853 B2 | 3/2015 | Davis et al. |
| 9,194,261 B2 | 11/2015 | McCarthy, Jr. |
| 9,279,344 B2 | 3/2016 | Chowdhury et al. |
| 9,371,915 B2 | 6/2016 | Mikami et al. |
| 9,395,012 B2 | 7/2016 | Paden et al. |
| 9,453,437 B2 | 9/2016 | Patterson et al. |
| 2005/0247058 A1* | 11/2005 | Pedersen ............... F01D 17/14 60/599 |
| 2007/0039584 A1 | 2/2007 | Ellingsen |
| 2010/0192892 A1 | 8/2010 | Huff |
| 2016/0025040 A1 | 1/2016 | Hill et al. |

* cited by examiner

MULTI-FLOWPATH FLUID CONTROL VALVE

BACKGROUND OF THE INVENTION

1. Technical Field

This disclosure relates generally to a fluid system and, more particularly, to an assembly including at least one fluid control valve.

2. Background Information

Various types and configurations of fluid control valves are known in the art. While these prior art fluid control valves have various advantages, there is still room in the art for improvement. For example, a butterfly control valve advantageously is operable to variably regulate fluid flow therethrough. A rotating disk of a typical butterfly valve, however, can create turbulence within the regulated fluid flow, particularly where the valve is only partially open. Such turbulence can decrease flow efficiency by increasing the pressure drop across the valve. Turbulence can also increase the temperature of the regulated fluid flow.

SUMMARY OF THE DISCLOSURE

According to an aspect of the present disclosure, an assembly is provided that includes a valve housing and a poppet valve. The valve housing includes a tubular duct and an annular valve seat disposed within the tubular duct. A first flowpath is configured from or otherwise includes an inner bore of the annular valve seat. A second flowpath is configured from or otherwise includes at least one aperture formed between the annular valve seat and the tubular duct. The poppet valve is configured to engage the annular valve seat and substantially close the first flowpath when the poppet valve is in a first position. The poppet valve is further configured to disengage the annular valve seat and at least partially open the first flowpath when the poppet valve is in a second position.

According to another aspect of the present disclosure, another assembly is provided that includes a valve housing and a valve element. The valve housing includes an inlet and an outlet. The valve housing is configured with an inner flowpath and an outer flowpath that substantially extends at least about one-hundred and eighty degrees (~180°) around the inner flowpath. The inner flowpath and the outer flowpath are fluidly coupled, in parallel, between the inlet and the outlet. The valve element is configured to substantially close the inner flowpath when the valve element is in a first position. The valve element is further configured to at least partially open the inner flowpath when the valve element is in a second position. The outer flowpath is open when the valve element is in the first position and the second position.

According to still another aspect of the present disclosure, an assembly is provided for a gas turbine engine. This gas turbine engine assembly includes a fluid control valve, a gas turbine engine fluid source and a gas turbine engine component that is fluidly coupled with the fluid source through the fluid control valve. The fluid control valve is configured with an inner flowpath and an outer flowpath that substantially extends at least about halfway around the inner flowpath. The inner flowpath and the outer flowpath are fluidly coupled, in parallel, between an inlet and an outlet. The fluid control valve includes the inlet, the outlet and a poppet valve. The poppet valve is configured to selectively open and close the inner flowpath without opening or closing the outer flowpath.

The assembly may be configured as an assembly of a gas turbine engine. The gas turbine engine may be configured as a turbojet engine or a turbofan engine for an aircraft, or any other type of gas turbine engine such as an industrial gas turbine engine.

The first flowpath may be an outer flowpath. The second flowpath may be an inner flowpath.

The first position may be a substantially fully closed position. The second position may be a partially open or fully open position.

The second flowpath may be open when the poppet valve is in the first position.

The first flowpath and the second flowpath may be substantially concentric.

The second flowpath may be substantially annular. Alternatively, the second flowpath may be parti-annular. For example, the second flowpath may be arcuate, semi-annular, etc.

The second flowpath may have a variable area that changes based on a position (e.g., axial translation) of the poppet valve relative to the annular valve seat.

The poppet valve may include a head and a stem. The head may be disposed between the annular valve seat and the stem, for example, when the poppet valve is in the first position and/or the second position.

The poppet valve may include a head and a stem. The stem may extend through the inner bore of the annular valve seat, for example, when the poppet valve is in the first position and/or the second position.

The valve housing may include a valve mount. The poppet valve may include a head and a stem connected to the head. The head may be configured to sealingly contact the annular valve seat when the poppet valve is in the first position. The stem may extend through and may be slidably engaged with the valve mount.

The valve mount may be connected to and project into the tubular duct.

The tubular duct may include and extend longitudinally between a duct inlet and a duct outlet. The duct inlet may be offset from the duct outlet. For example, a cross-sectional plane of the duct inlet may be angularly offset from a cross-sectional plane of the duct outlet.

The assembly may further include a fluid control valve, a fluid source and a component, which component is configured to receive fluid from the fluid source through the fluid control valve. The fluid control valve may include the valve housing and the poppet valve.

The assembly may further include a gas turbine engine comprising the fluid control valve, the fluid source and the component. This gas turbine engine may be configured as a turbojet engine or a turbofan engine for an aircraft, or any other type of gas turbine engine such as an industrial gas turbine engine.

The fluid may be air for cooling the component.

The valve element may be configured as a poppet valve.

The valve housing may include a tubular duct and an annular valve seat disposed within and connected to the tubular duct. The inner flowpath may be configured as or otherwise include an inner bore of the annular valve seat. The outer flowpath may be configured as or otherwise include an aperture formed between the annular valve seat and the tubular duct. The valve element may be configured to engage the annular valve seat when the valve element is in the first position. The valve element may be configured to disengage the annular valve seat when the valve element is in the second position.

The outer flowpath may be substantially annular.

The foregoing features and the operation of the invention will become more apparent in light of the following description and the accompanying drawings.

DETAILED DESCRIPTION OF THE INVENTION

Figure 1:
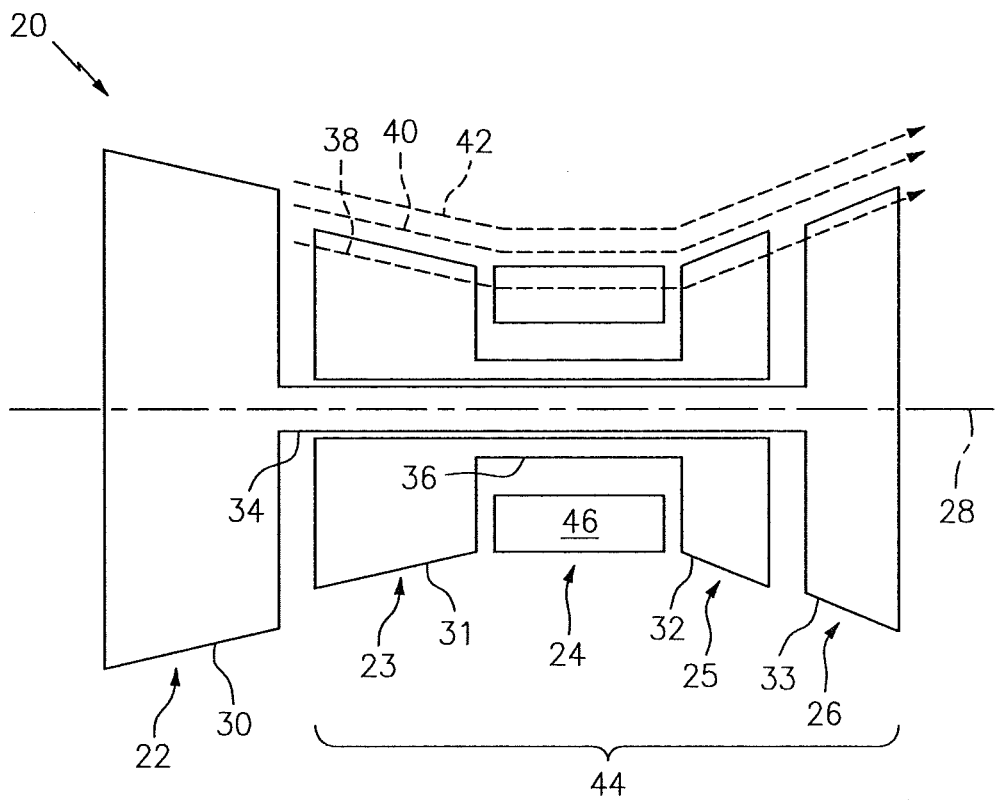
FIG. 1 is a schematic illustration of a gas turbine engine.

FIG. 1 is a schematic illustration of a gas turbine engine 20. This gas turbine engine 20 is configured as a turbojet engine for an aircraft propulsion system. The gas turbine engine 20 includes a fan section 22, a compressor section 23, a combustor section 24, a high pressure turbine (HPT) section 25 and a low pressure turbine (LPT) section 26. These engine sections 22-26 are arranged sequentially along a rotational axis 28 of the gas turbine engine 20.

Each of the engine sections 22-26 includes a respective rotor 30-33. Each of these rotors 30-33 includes a plurality of rotor blades (not shown) arranged circumferentially around and connected to one or more respective rotor disks (not shown). A circumferential array of rotor blades, for example, may be formed integral with or mechanically fastened, welded, brazed, adhered and/or otherwise attached to a respective rotor disk. At least one array of vanes (not shown) may be arranged adjacent or proximate to each array of rotor blades to guide (e.g., turn) gas into or away from that array of rotor blades.

The fan rotor 30 is connected to the LPT rotor 33 through a low speed shaft 34. These engine components 30, 33 and 34 form a low speed spool. The compressor rotor 31 is connected to the HPT rotor 32 through a high speed shaft 36. These engine components 31, 32 and 36 form a high speed spool. The low and the high speed shafts 34 and 36 are rotatably supported by a plurality of bearings (not shown), each of which is connected to a stationary support structure of the gas turbine engine 20.

During operation, air enters the gas turbine engine 20 through an airflow inlet. This air is directed through the fan section 22 and into an annular core gas path 38 and one or more annular bypass gas paths 40 and 42. The core gas path 38 extends sequentially through the engine sections 23-26. The air within the core gas path 38 may be referred to as "core air". The air within each of the bypass gas paths 40 and 42 may be referred to as "bypass air". This air is referred to as bypass air since each of the bypass gas paths 40 and 42 extends outside of and thereby bypasses at least a portion or all of a core 44 of the gas turbine engine 20; e.g., engine sections 23-26.

The core air is compressed by the fan rotor 30 and the compressor rotor 31. This compressed core air is directed into a combustion chamber 46 of a combustor in the combustor section 24. Fuel is injected into the combustion chamber 46 by one or more fuel injectors (not shown). The injected fuel is mixed with the compressed core air to provide a fuel-air mixture. This fuel air mixture is ignited and combustion products thereof flow through and sequentially cause the turbine rotors 32 and 33 to rotate. The rotation of the turbine rotors 32 and 33 respectively drive rotation of the compressor rotor 31 and the fan rotor 30 and, thus, compression of the air received into the gas turbine engine 20.

Figure 2:
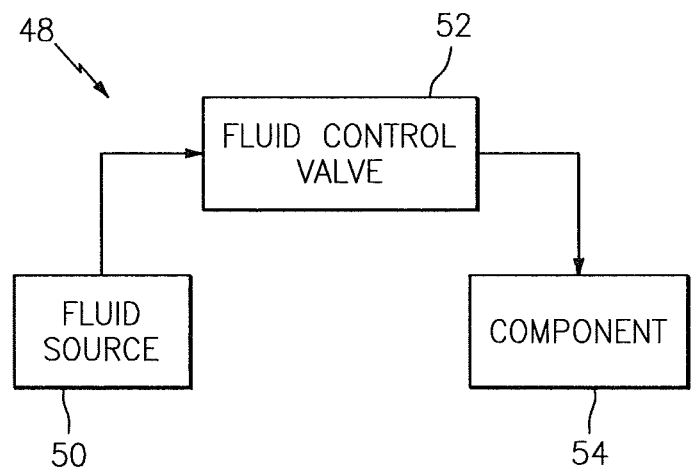
FIG. 2 is a schematic illustration of a fluid circuit for a piece of equipment such as the gas turbine engine of FIG. 1.

FIG. 2 is a schematic illustration of a fluid circuit 48 for a piece of equipment such as, but not limited to, the gas turbine engine 20 shown in FIG. 1. This fluid circuit 48 includes a fluid source 50, a fluid control valve 52 and a component 54 that receives fluid from the fluid source 50 through the fluid control valve 52. The fluid may be a gas such as, but not limited to, air. The fluid may alternatively be a liquid such as, but not limited to, coolant, lubricant and/or fuel. Still alternatively, the fluid may be a mixture of gas and liquid.

The fluid source 50 is configured to provide the fluid to the fluid circuit 48. The fluid source 50, for example, may be configured as an inlet orifice, an inlet duct and/or a scoop that receives air bled from one of the gas paths 38, 40, 42 (see FIG. 1). Alternatively, the fluid source 50 may be configured as a reservoir (e.g., a tank or sump), which contains coolant, lubricant or fuel, or a conduit. The present disclosure, of course, is not limited to the foregoing exemplary fluid source configurations.

The component 54 is configured to use, manipulate and/or redirect the fluid received from the fluid circuit 48. For example, the component 54 may be configured as or otherwise include at least one of the bearings, shrouds (also known as blade outer air seals (BOAS)), rotor disks, rotor blades, vanes or seal elements of the gas turbine engine 20, which is cooled (or heated) by the fluid. The component 54 may be configured as or otherwise include at least one of the bearings of the gas turbine engine 20, which is lubricated by the fluid. The component 54 may be configured as or otherwise include at least one actuator for the gas turbine engine 20, which is pneumatically or hydraulically powered by the fluid. The component 54 may be configured as or otherwise include at least one of the fuel injectors for the gas turbine engine 20, which injects or otherwise redirects the fluid into another component and/or a volume such as the combustion chamber 46. The present disclosure, of course, is not limited to the foregoing exemplary component configurations or fluid uses.

The fluid control valve 52 is configured to regulate flow of the fluid from the fluid source 50 to the component 54. The fluid control valve 52, for example, may be configured to operate in at least two different states: a first (e.g., fully closed) state and a second (e.g., fully open) state. In the first state, the fluid may flow through the fluid control valve 52 at a first (non-zero) flow rate. In the second state, the fluid may flow through the fluid control valve 52 at a second (non-zero) flow rate that is greater than the first flow rate. For example, the second flow rate may be between about one and one half (1.5) to about two (2) times the first flow rate; however, the present disclosure is not limited to the foregoing exemplary flow rate ratio.

In some embodiments, the fluid control valve 52 may further operate in one or more additional intermediate flow states. In each of these intermediate flow states, the fluid may flow through the fluid control valve 52 at a respective intermediate flow rate that is greater than the first flow rate and less than the second flow rate. The intermediate flow states may be predetermined, or variable where the fluid control valve 52, for example, is configured to be infinitely adjustable between the first and the second states.

Figure 3:
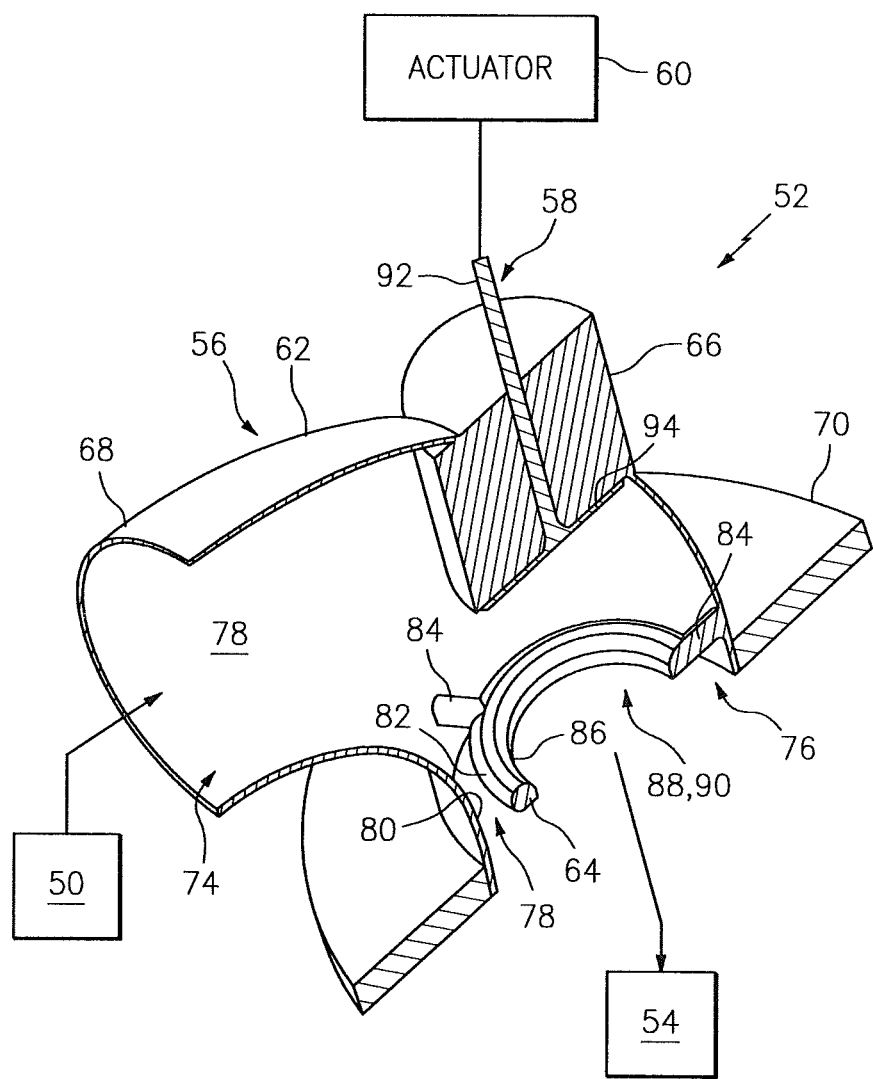
FIG. 3 is a sectional, perspective illustration of a fluid control valve in an open state and fluidly inline between a fluid source and a component, where the fluid source, the component and an actuator for the fluid control valve are schematically shown.
Figure 4:
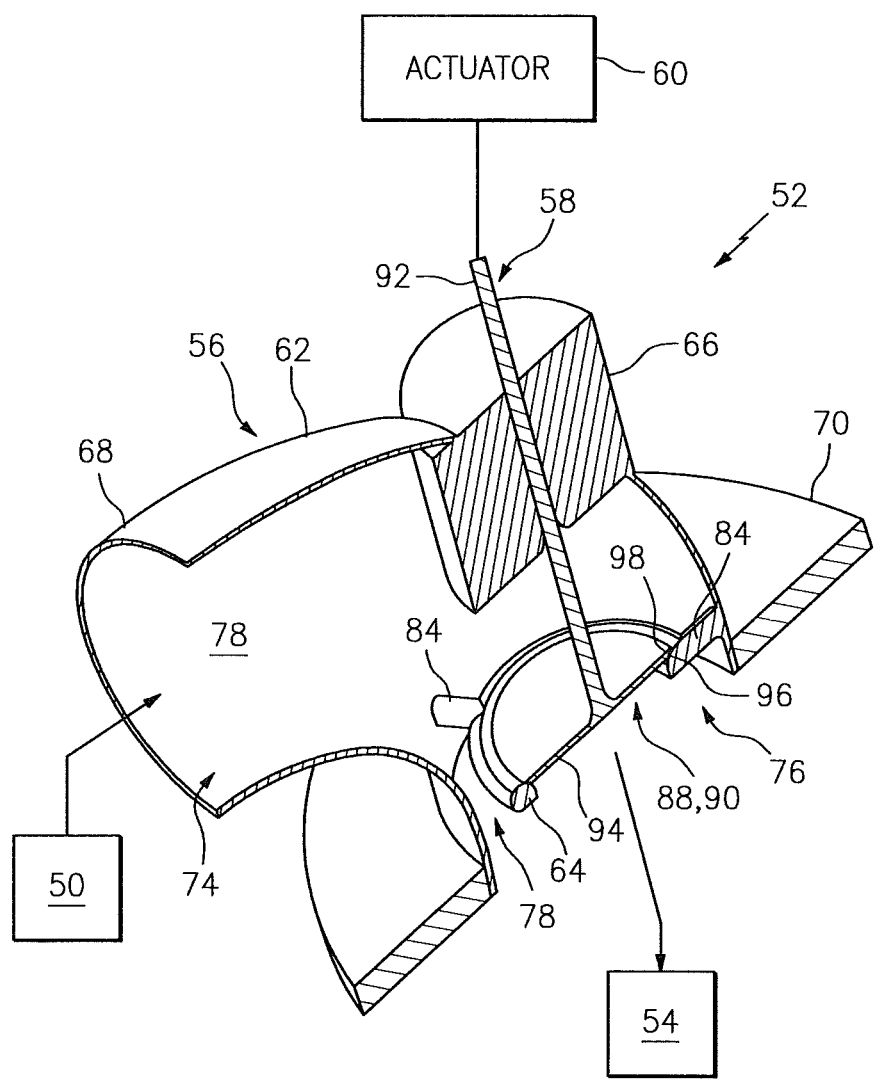
FIG. 4 is a sectional, perspective illustration of the assembly of FIG. 3 with the fluid control valve in a closed state.
Figure 5:
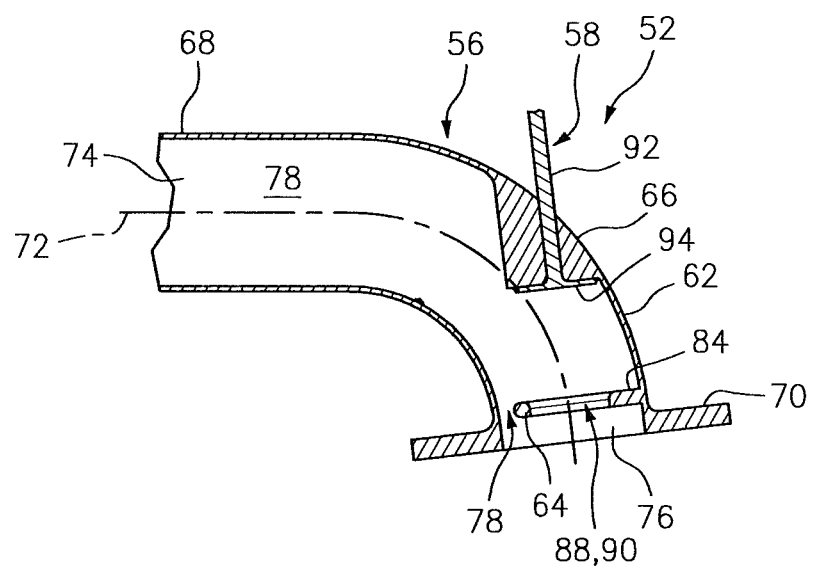
FIG. 5 is a partial sectional illustration of another fluid control valve in an open state.
Figure 6:
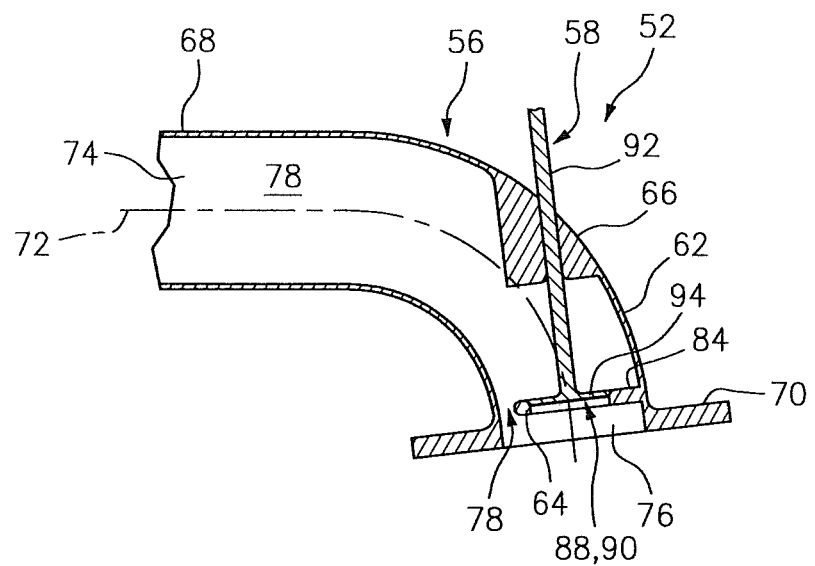
FIG. 6 is a partial sectional illustration of the fluid control valve of FIG. 5 in a closed state.

FIGS. 3 and 4 illustrate an exemplary embodiment of the fluid control valve 52. In FIG. 3 (see also FIG. 5), the fluid control valve 52 is shown in the second (e.g., fully open) state. In FIG. 4 (see also FIG. 6), the fluid control valve 52 is shown in the first (e.g., fully closed) state.

The fluid control valve 52 of FIGS. 3 and 4 is configured as a multi-parallel flowpath control valve. In particular, the fluid control valve 52 of FIGS. 3 and 4 includes a valve housing 56, a valve element 58 and an actuator 60. Briefly, the actuator 60 may be electrically, hydraulically or pneumatically controlled. Various types and configurations of actuators are known in the art, and the present disclosure is not limited to any particular ones thereof.

The valve housing 56 includes a tubular duct 62 and an annular valve seat 64. The valve housing 56 also includes a valve mount 66 and one or more housing mounts 68 and 70. Briefly, as described below in further detail, the terms "tubular" and "annular" are used herein to describe a body with an internal aperture; e.g., bore, through-hole, orifice, etc. While the tubular duct 62 and an annular valve seat 64 are shown in the figures with generally circular cross-sectional geometries, these bodies are not limited thereto. For example, the tubular duct and/or annular valve seat 64 may each alternatively have an oval or elliptical cross-sectional geometry, a polygonal cross-sectional geometry or other suitable cross-sectional geometry.

The duct 62 of FIGS. 3 and 4 is configured with a generally constant and circular cross-sectional geometry. However, in other embodiments, the duct 62 may be configured with another and/or variable cross-sectional geometry; e.g., an elliptical or polygon (e.g., a rectangle) cross-sectional geometry. The duct 62 extends longitudinally along a longitudinal centerline 72 of the valve housing 56 (see FIGS. 5 and 6) between a duct inlet 74 and a duct outlet 76, where the inlet 74 is fluidly coupled with the fluid source 50 and the outlet 76 is fluidly coupled with the component 54. In this manner, the duct 62 forms a duct bore 78 which extends longitudinally between and is fluidly coupled with the inlet 74 and the outlet 76.

The inlet 74 may be offset from the outlet 76. For example, due to the curvilinear (or otherwise non-linear) shape of the longitudinal centerline 72 (see FIGS. 5 and 6), a cross-sectional plane of the inlet 74 is angularly offset from a cross-sectional plane of the outlet 76 by an angle; e.g., about ninety degrees. The present disclosure, however, is not limited to the foregoing exemplary inlet-outlet offset.

The valve seat 64 is disposed within and is connected to the duct 62. The valve seat 64 of FIGS. 3 and 4, for example, is arranged coaxial with the duct 62 such that a substantially annular outer flowpath 78 is formed radially between an inner surface 80 of the duct 62 and an outer surface 82 of the valve seat 64 (see FIG. 3). The outer flowpath 78 is referred to above as being "substantially" annular because this flowpath 78 may be circumferentially segmented by one or more struts 84, which connect the valve seat 64 to the duct 62. However, a lateral (e.g., tangential or circumferential) width of each strut 84, in general, is minimized so as to reduce flow impediments and disturbances to the fluid directed through the outer flowpath 78. The outer flowpath 78 in FIGS. 3 and 4 is thereby formed by an array of parti-annular (e.g., arcuate) apertures. Each of these apertures extends circumferentially between an adjacent pair of the struts 84, and radially between the inner surface 80 and the outer surface 82.

An inner surface 86 (see FIG. 3) of the valve seat 64 forms an inner bore 88 that extends longitudinally through the valve seat 64. This inner bore 88 forms an inner flowpath 90. This inner flowpath 90 may be arranged coaxial with the outer flowpath 78 as shown in FIGS. 3 and 4. With this configuration, the outer flowpath 78 extends substantially completely around the inner flowpath 90. Furthermore, the outer flowpath 78 and the inner flowpath 90 are fluidly coupled, in parallel, between the inlet 74 and the outlet 76.

The valve seat 64 of FIGS. 3 and 4 is configured with a generally circular cross-sectional geometry. However, in other embodiments, the valve seat 64 may be configured with another cross-sectional geometry; e.g., an elliptical or polygon (e.g., a rectangle) cross-sectional geometry. In general, the cross-sectional shape of the valve seat 64 will be selected to match a cross-sectional shape of a head 94 of the valve element 58.

The valve mount 66 is configured as a generally tubular body such as a static bushing structure. In the specific embodiment shown in FIGS. 3 and 4, the valve mount 66 is located upstream of the valve seat 64. This valve mount 66 is connected to the duct 62, and may project into and/or out from the duct 62. The valve mount 66 is coaxial with the valve seat 64.

Each of the housing mounts 68 and 70 is configured to facilitate connecting the valve housing 56 to an adjacent element in the fluid circuit 48; e.g., a conduit, the fluid source 50, the component 54, or another coupling device. For example, the housing mount 68 is located at the inlet 74 and is configured as a distal end portion of the duct 62. With this configuration, an adjacent upstream element of the fluid circuit 48 can be connected to the valve housing 56 via a butt connection, a sleeved connection or any other type of suitable connection. In another example, the housing mount 70 is located at the outlet 76 and is configured as a flange for mechanically fastening to the adjacent downstream element. The present disclosure, of course, is not limited to the foregoing exemplary housing mount configurations.

The valve element 58 of FIGS. 3 and 4 is configured as a poppet valve. This valve element 58, for example, includes a poppet valve stem 92 and the poppet valve pan head 94. The stem 92 projects axially out from and is connected to the head 94. The stem 92 is configured to sealingly engage and slide axially within a bore of the valve mount 66. In this manner, the stem 92 may extend through the valve housing 56 and connect the head 94, which is inside the valve housing 56, to the actuator 60, which is outside the valve housing 56. This enables the actuator 60 to move the head 94 axially between a first (e.g., fully closed) position where the fluid control valve 52 is in the first state (see FIG. 4) and a second (e.g., fully open) position where the fluid control valve 52 is in the second state (see FIG. 3).

The head 94 is configured to engage the valve seat 64 when the valve element 58 is in the first position of FIG. 4. In particular, an annular seal face 96 of the head 94 is configured to sealingly contact an annular seal face 98 of the valve seat 64 (see also FIG. 9) when the valve element 58 is in the first position of FIG. 4. In this manner, the head 94 is operable to substantially completely close the inner flowpath 90 when the valve element 58 is in the first position of FIG. 4 such that the fluid may only flow through the outer flowpath 78. This in turn reduces the flow through the fluid control valve 52.

By contrast, the head 94 is also configured to disengage from the valve seat 64 when the valve element 58 is in the second position of FIG. 3. In this manner, the head 94 is operable to substantially open the inner flowpath 90 such that the fluid may flow, in parallel, through both the outer flowpath 78 and the inner flowpath 90 when the valve element 58 is in the second position of FIG. 3. This in turn increases the flow through the fluid control valve 52.

In some embodiments, the stem 92 may extend along its translatable axis through the valve seat 64 in both the first position and the second position as shown in FIGS. 3-6. With this arrangement, the head 94 may be moved (e.g., axially translated) close to or against the valve mount 66 in order to reduce flow impediments within the duct 62.

Figure 7:
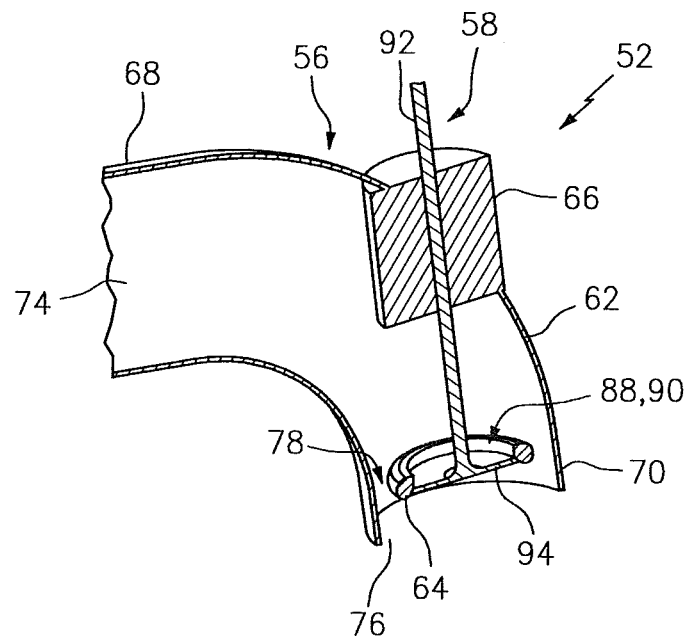
FIG. 7 is a partial sectional, perspective illustration of still another fluid control valve in an open state.
Figure 8:
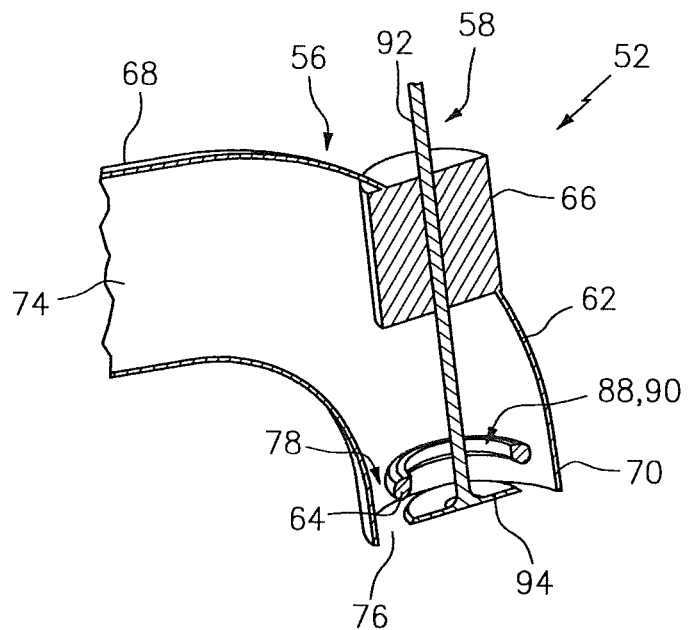
FIG. 8 is a partial sectional, perspective illustration of the fluid control valve of FIG. 7 in an open state.

In other embodiments, the head 94 may be disposed between the stem 92 and the valve seat 64 in both the first position and the second position as shown in FIGS. 7 and 8. With this arrangement, the valve element 58 may be mated with the valve mount 66 after the valve mount 66 is connected to the duct 62. In addition, since the annular seal face 98 of the valve seat 64 is exterior facing, there is better access to this seal face 98 for machining.

Figure 9:
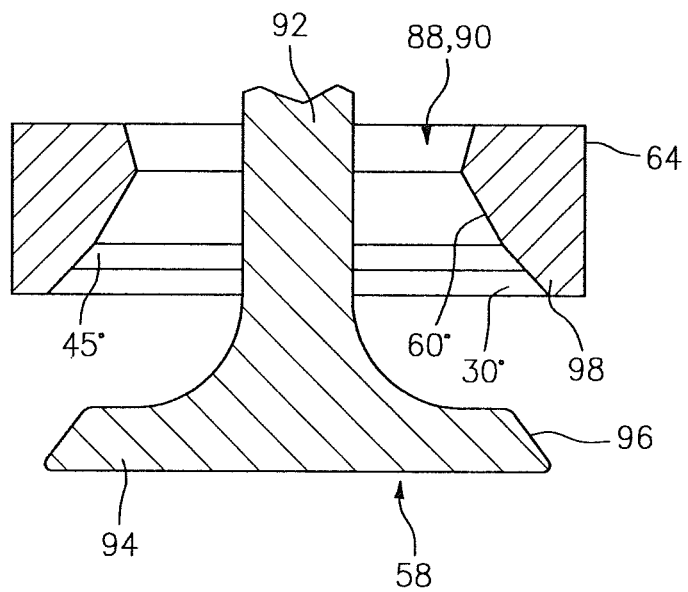
FIG. 9 is a sectional illustration of a portion of a valve seat and a poppet valve in an open position.

Referring to FIG. 9, in some embodiments, the annular seal face 98 of the valve seat 64 may be configured with multi-faceted surfaces. Such multi-faceted surfaces may promote improved sealing contact between the annular seal face 98 of the valve seat 64 and the annular seal face 96 of the valve element head 94.

Figure 10:
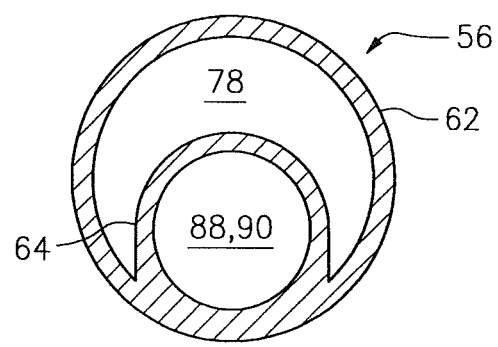
FIG. 10 is a cross-sectional illustration of a valve housing.

Referring to FIG. 10, in some embodiments, the valve seat 64 may be connected directly to the duct 62; e.g., without strut(s). With such a configuration, the outer flowpath 78 has a parti-annular cross-sectional geometry. More particularly, the outer flowpath 78 of FIG. 10 extends at least about halfway (e.g., one-hundred and eighty degrees) around the valve seat 64 and the inner flowpath 90; e.g., about three-quarters the way around 64 and 78. Of course, the present disclosure is not limited to the foregoing exemplary values.

The fluid circuit 48 may be included in various aircraft and industrial gas turbine engines other than the one described above as well as in other types of rotational and non-rotational equipment. The fluid circuit 48, for example, may be included in a geared turbine engine where a gear train connects one or more shafts to one or more rotors in a fan section, a compressor section and/or any other engine section. Alternatively, the fluid circuit 48 may be included in a turbine engine configured without a gear train. The fluid circuit 48 may be included in a geared or non-geared gas turbine engine configured with a single spool, with two spools (e.g., see FIG. 1), or with more than two spools. The gas turbine engine may be configured as a turbofan engine, a propfan engine, a pusher fan engine or any other type of gas turbine engine. The present disclosure therefore is not limited to any particular types or configurations of turbine engine. Furthermore, as mentioned above, the fluid circuit 48 of the present disclosure may also be utilized for non-turbine engine applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly, comprising:
   a valve housing including a tubular duct and an annular valve seat disposed within the tubular duct, wherein a first flowpath comprises an inner bore of the annular valve seat, a second flowpath comprises an aperture formed between the annular valve seat and the tubular duct, and the aperture extends circumferentially about a centerline of the inner bore; and
   a poppet valve configured to engage the annular valve seat and close the first flowpath when the poppet valve is in a first position, the poppet valve configured to disengage the annular valve seat and at least partially open the first flowpath when the poppet valve is in a second position, and the poppet valve comprising a head and a stem;
   the stem projecting out from the head, through a second aperture in the tubular duct, and out of the valve housing.

2. The assembly of claim 1, wherein
   the valve housing further comprises a valve mount;
   the stem is connected to the head;
   the head is configured to sealingly contact the annular valve seat when the poppet valve is in the first position; and
   the stem extends through and is slidably engaged with the valve mount.

3. The assembly of claim 2, wherein the valve mount is connected to and projects into the tubular duct.

4. The assembly of claim 1, wherein
   the tubular duct includes and extends longitudinally between a duct inlet and a duct outlet; and
   the duct inlet is offset from the duct outlet.

5. The assembly of claim 4, wherein a cross-sectional plane of the duct inlet is angularly offset from a cross-sectional plane of the duct outlet.

6. The assembly of claim 1, further comprising:
   a fluid control valve comprising the valve housing and the poppet valve;
   a fluid source; and
   a component configured to receive fluid from the fluid source through the fluid control valve.

7. The assembly of claim 6, further comprising a gas turbine engine comprising the fluid control valve, the fluid source and the component.

8. The assembly of claim 1, wherein the second flowpath is open when the poppet valve is in the first position.

9. The assembly of claim 1, wherein the first flowpath and the second flowpath are concentric.

10. The assembly of claim 1, wherein the second flowpath is annular.

11. The assembly of claim 1, wherein the second flowpath is partially-annular.

12. The assembly of claim 1, wherein the second flowpath has a variable area that changes based on a position of the poppet valve relative to the annular valve seat.

13. The assembly of claim 1, wherein the head is disposed between the annular valve seat and the stem.

14. The assembly of claim 1, wherein the stem extends through the inner bore of the annular valve seat.

15. The assembly of claim 1, further comprising:
an actuator disposed outside of the valve housing;
the actuator configured as an electrically controlled actuator, a pneumatically controlled actuator or a hydraulically controlled actuator; and
a portion of the stem outside of the valve housing coupled to the actuator.

16. An assembly, comprising:
a valve housing including an inlet and an outlet, and configured with an inner flowpath and an outer flowpath that extends at least one-hundred and eighty degrees around the inner flowpath, wherein the inner flowpath and the outer flowpath are fluidly coupled, in parallel, between the inlet and the outlet; and
a valve element configured to close the inner flowpath when the valve element is in a first position, and the valve element configured to at least partially open the inner flowpath when the valve element is in a second position; and
an actuator configured to move the valve element between the first position and the second position, the actuator configured as one of an electrically controlled actuator, a pneumatically controlled actuator or a hydraulically controlled actuator;
wherein the outer flowpath is open when the valve element is in the first position and the second position.

17. The assembly of claim 16, wherein
the valve housing includes a tubular duct and an annular valve seat disposed within and connected to the tubular duct;
the inner flowpath comprises an inner bore of the annular valve seat;
the outer flowpath comprises an aperture formed between the annular valve seat and the tubular duct;
the valve element configured to engage the annular valve seat when the valve element is in the first position; and
the valve element configured to disengage from the annular valve seat when the valve element is in the second position.

18. The assembly of claim 16, wherein the outer flowpath is annular.

19. The assembly of claim 16, wherein the actuator is located outside of the valve housing.

\* \* \* \* \*